US009466980B2

(12) United States Patent
Nettelblad et al.

(10) Patent No.: US 9,466,980 B2
(45) Date of Patent: Oct. 11, 2016

(54) POWER ARRANGEMENT FOR PREVENTING CIRCULATING LOOP CURRENTS WITHIN THE ARRANGEMENT

(75) Inventors: Bo Nettelblad, Göteborg (SE); Daniel Dermark, Landvetter (SE)

(73) Assignee: SAAB AB, Linkoeping (SE)

( * ) Notice: Subject to any disclaimer, the term of this patent is extended or adjusted under 35 U.S.C. 154(b) by 538 days.

(21) Appl. No.: 13/884,105

(22) PCT Filed: Nov. 22, 2010

(86) PCT No.: PCT/SE2010/051285
§ 371 (c)(1),
(2), (4) Date: Jul. 2, 2013

(87) PCT Pub. No.: WO2012/070987
PCT Pub. Date: May 31, 2012

(65) Prior Publication Data
US 2013/0270903 A1   Oct. 17, 2013

(51) Int. Cl.
*H02J 1/00* (2006.01)
*H02J 1/06* (2006.01)
(Continued)

(52) U.S. Cl.
CPC .. *H02J 1/00* (2013.01); *H02J 1/08* (2013.01); *H02J 1/06* (2013.01); *H02M 1/44* (2013.01); *Y10T 307/707* (2015.04)

(58) Field of Classification Search
CPC ............. H02J 1/00; H02J 1/06; H02M 1/44; Y10T 307/707
USPC ......................................................... 307/82
See application file for complete search history.

(56) References Cited

U.S. PATENT DOCUMENTS 3,829,705 A * 8/1974 Richter ............... H04B 1/1607
307/116
5,990,757 A   11/1999 Tonomura et al.
(Continued)

FOREIGN PATENT DOCUMENTS

EP        1981255 A1    10/2008
WO    WO 02/31951 A2    4/2002

OTHER PUBLICATIONS

International Searching Authority, International Search Report for International Application No. PCT/SE2010/051285, mailed Jul. 21, 2011, 4 pages, The Swedish Patent and Registration Office, Sweden.
(Continued)

*Primary Examiner* — Hal Kaplan
(74) *Attorney, Agent, or Firm* — Alston & Bird LLP

(57) ABSTRACT

Power supply arrangement for distribution of power from a DC power source having a positive terminal and a negative terminal to at least a first and a second DC power consumer, comprising: a first DC power consumer connected to the negative terminal of the DC power source, a first DC-DC switching power converter connected to the first DC power consumer, and connected to the positive terminal of said DC power source, a second DC power consumer connected to the negative terminal of the DC power source, a second DC-DC switching power converter connected to the second DC power consumer, and connected to the positive terminal of said DC power source, wherein a unit comprising a capacitor connected in parallel with an electrical device is arranged in each of the first and second return lines, wherein said electrical device has a diode function, whereby circulating ground loop currents are prevented.

9 Claims, 1 Drawing Sheet

(51) Int. Cl.
*H02M 1/44* (2007.01)
*H02J 1/08* (2006.01)

(56) References Cited

U.S. PATENT DOCUMENTS 7,586,212 B2 9/2009 Morita et al.
2005/0156204 A1* 7/2005 Uno ...................... H01L 25/165
257/213
2008/0247108 A1* 10/2008 Ando ................... H02H 7/0833
361/84

OTHER PUBLICATIONS

International Searching Authority, Written Opinion for International Application No. PCT/SE2010/051285, mailed Jul. 21, 2011, 4 pages, The Swedish Patent and Registration Office, Sweden.

* cited by examiner

POWER ARRANGEMENT FOR PREVENTING CIRCULATING LOOP CURRENTS WITHIN THE ARRANGEMENT

CROSS REFERENCE TO RELATED APPLICATIONS

This application is a national stage application, filed under 35 U.S.C. §371, of International Application No. PCT/SE2010/051285, filed Nov. 22, 2010, the contents of which are hereby incorporated by reference in its entirety.

BACKGROUND

1. Related Field

The present invention relates to the field of distributed power arrangements preventing circulating loop currents within said arrangements.

The present invention relates to a power supply arrangement for distribution of power from a Direct Current, DC, power source having a positive terminal and a negative terminal to at least a first and a second DC power consumer, comprising: a first DC power consumer connected to said negative terminal of said DC power source by means of at least a first return line, a first DC-DC switching power converter connected to said first DC power consumer by means of at least a first supply line, and connected to said positive terminal of said DC power source, a second DC power consumer connected to said negative terminal of said DC power source by means of at least a second return line, a second DC-DC switching power converter connected to said second DC power consumer by means of at least a second supply line, and connected to said positive terminal of said DC power source.

2. Description of Related Art

Today, there exist various examples of power arrangements comprising a plurality of converters and consumers, i.e. loads, connected to the same DC power source, which exhibit circulating DC currents in ground loop, i.e. return loop currents, created by connections between chassis or fuselage and said consumers. These circulating ground loop currents give raise to unintended voltage drops and emitted radiation causing electromagnetic interference, EMI. One solution for preventing circulating ground loop currents is to include a transformer in the power conversion providing galvanic isolation, but transformers are heavy and bulky, and may increase the level of common-mode currents. Another solution provides diodes in the return lines, but this solution leads to voltage drop and thus power losses, whereby normal functions of the equipment comprising said power arrangement may be interfered.

U.S. Pat. No. 5,990,757 shows a solution for preventing ground loop currents in power supply arrangements comprising switched converters connected in parallel to multiple loads consisting of diodes arranged in each power supply line. However this solution leads to power losses.

These present solutions are restricted to heavy and bulky transformers and leads to reduction in voltage in the power arrangement.

There is thus a need for an improved solution and power supply arrangement removing the above mentioned disadvantages.

BRIEF SUMMARY

The present invention is defined by the appended independent claims. Various examples of the invention are set forth by the appended dependent claims as well as by the following description and the accompanying drawings.

With the above description in mind, then, an aspect of the present invention is to provide an improved solution of preventing ground or return loop currents from circulating in the power supply arrangement which seeks to mitigate, alleviate, or eliminate one or more of the above-identified deficiencies in the art and disadvantages singly or in any combination. The object of the present invention is to provide an inventive power supply arrangement for distributing power from a DC power source having a positive terminal and a negative terminal to at least a first and a second DC power consumer where the previously mentioned problems are partly avoided. This object is achieved by the features of claim 10 wherein, a power supply arrangement for distribution of power from a DC power source having a positive terminal and a negative terminal, to at least a first and a second DC power consumer, comprising a first DC power consumer connected to said negative terminal of said DC power source by means of at least a first return line, a first DC-DC switching power converter connected to said first DC power consumer, and connected to said positive terminal of said DC power source, a second DC power consumer connected to said negative terminal of said DC power source by means of at least a second return line, a second DC-DC switching power converter connected to said second DC power consumer, and connected to said positive terminal of said DC power source, characterised in that a first unit comprising a first capacitor connected in parallel with a first electrical device is arranged in said first return line, wherein said first electrical device has a diode function, and a second unit comprising a second capacitor connected in parallel with a second electrical device is arranged in said second return line, wherein said second electrical device has a diode function. Said first unit is a combination of a capacitor and a diode which are connected in parallel. Said second unit is a combination of a capacitor and a diode which are connected in parallel. The currents flows from positive to negative potential and said first and second units arranged in the return line of the switching power converters, such as switching step-down converters, causes blocking of currents that circulate via a ground or a chassis ground. Thus the ground loop currents, i.e. return loop currents, are prevented. The present invention may comprise more than two converters.

The switched DC-power of the power supply line appears like AC-power to said first and second capacitor, which thus pass switched DC-power without voltage fall and associated power losses. Circulating DC-ground loop currents are blocked by said first and second capacitor, as well as by said first and second diode. Consequently, a power supply arrangement is provided preventing circulating ground loop currents without the above-identified disadvantages associated with the solutions according to the prior art.

Said object is further achieved by the features of claim 18, wherein a vehicle comprises said inventive power supply arrangement.

Further advantages are achieved by implementing one or several of the features of the dependent claims.

According to a further advantageous aspect of the invention, at least one of said first and second electrical device is a diode.

According to a further advantageous aspect of the invention, at least one of said electrical devices is a bipolar transistor.

According to a further advantageous aspect of the invention, said first and second electrical devices connected in parallel are adapted to stabilise and determine the potential of said first and second units, thus preventing any build-up charge at said parallel connected first and second capacitors.

According to a further advantageous aspect of the invention, said first and second capacitors connected in parallel are adapted to block circulating ground loop currents within said distributing power supply arrangement. Said circulating ground loop currents, i.e. circulating return loop currents, are ground loop currents or chassis ground loop currents.

According to a further advantageous aspect of the invention, the typical switching frequency of said first and second DC-DC switching power converters is in the MHz-region.

According to a further advantageous aspect of the invention, the capacitance value of said first and second capacitors are adapted to the switching frequency of said first and second DC-DC switching power converters, by allowing current of the switching frequency to pass while not allowing currents of lower frequency to pass.

According to a further advantageous aspect of the invention, at least one of said first and second DC-DC switching power converters is of non-isolated type.

Any of the advantageous features of the present invention above may be combined in any suitable way.

A number of advantages are provided by means of the present invention, for example:
- circulating ground loop currents induced due to different lengths of return lines, different impedance or different dimensions of the conductors forming the return lines are prevented;
- circulating low frequency currents are prevented;
- stable potential of the parallel units is obtained, thus preventing any build-up charge at capacitor in the respective parallel unit;
- a solution with low weight is obtained;
- a solution with small size is obtained;
- a solution with smaller power losses than using transformers or diodes only is obtained.

BRIEF DESCRIPTION OF THE FIGURES

The present invention will now be described in detail with reference to the figures, wherein.

DETAILED DESCRIPTION OF VARIOUS EMBODIMENTS

Figure 1:
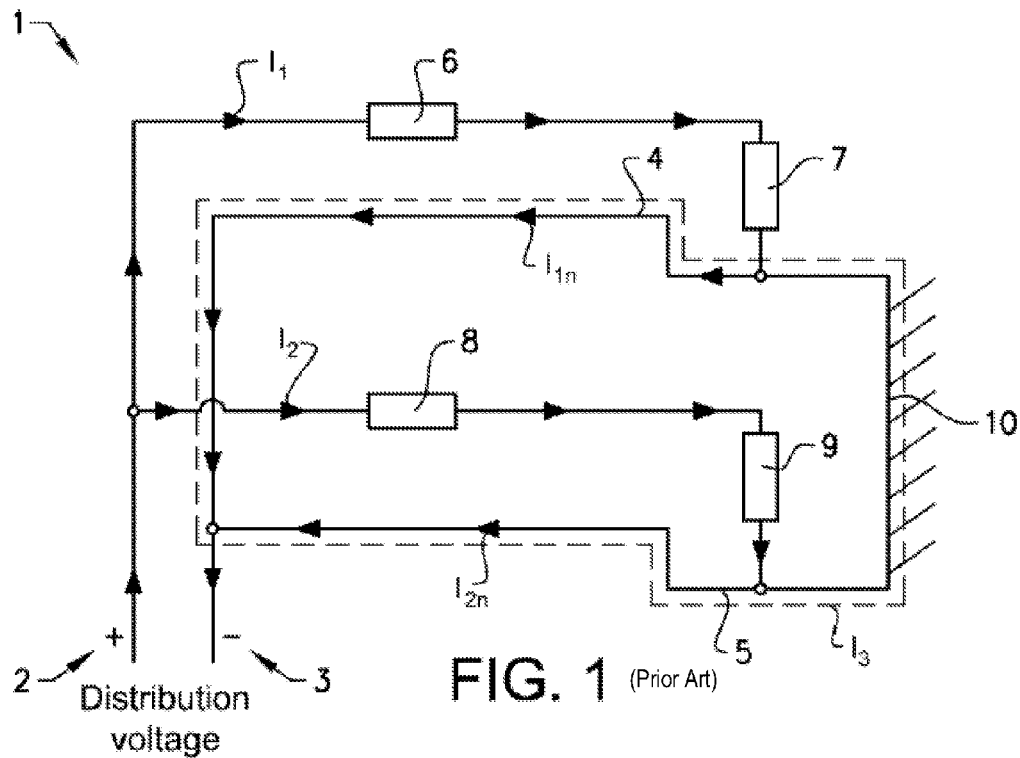
FIG. 1 shows a schematically illustration of a distributing power arrangement according to prior art.

For distributed power arrangements, a distribution voltage is converted to different voltages close to the power consumers. In many distributed power arrangements, the chassis or fuselage is used as a common return for several different voltages, at least for a part of the distributed power arrangements. In other distributed power arrangements, the consumer is connected to the chassis even though each voltage has its separate return, as shown in FIG. 1. FIG. 1 refers to prior art and shows a distributing power arrangement 1 wherein potential ground loop currents are illustrated. This distributed power arrangement 1 comprise a DC power source having a positive terminal 2 and a negative terminal 3, a first converter 6, a first consumer 7, a first return line 4, a second converter 8, a second consumer 9, a second return line and a chassis 10 to which the first and second consumers 7, 9 are connected. Large ground loop currents may arise in these circumstances which are schematically illustrated in the example shown in FIG. 1. The first current $I_1$ illustrates the flow from plus to minus through the first converter 6, the first consumer 7 and ideally, but not always in practice, through the first return line 4. The second current $I_2$ illustrates the flow from plus to minus through the second converter 8, the second consumer 9 and ideally, but not always in practice, through the second return line 5. The circulating ground loop currents $I_3$ which are exhibit in these known distributed power arrangements 1 are illustrated as a dotted line in FIG. 1. The circulating ground loop currents $I_3$ are exhibit when not all of the first and second currents $I_1$ and $I_2$ flow via the first and the second return lines 4 and 5. Thus when circulating ground loop currents $I_3$ are exhibit, in the first return line 4 a first return line current $I_{1n}$ are exhibit, and in the second return line 5 a second return line current $I_{2n}$ are exhibit. The first return line current $I_{1n}$ is not equal to the first current $I_1$. The second return line current $I_{2n}$ is not equal to the second current $I_2$. The circulating ground loop currents $I_3$ illustrated in FIG. 1 are defined by the following equation:

$$I_3=(I_1-I_{1n})+(I_2-I_{2n})$$

In the following only one embodiment of the invention is shown and described, simply by way of illustration of one mode of carrying out the invention.

Figure 2:
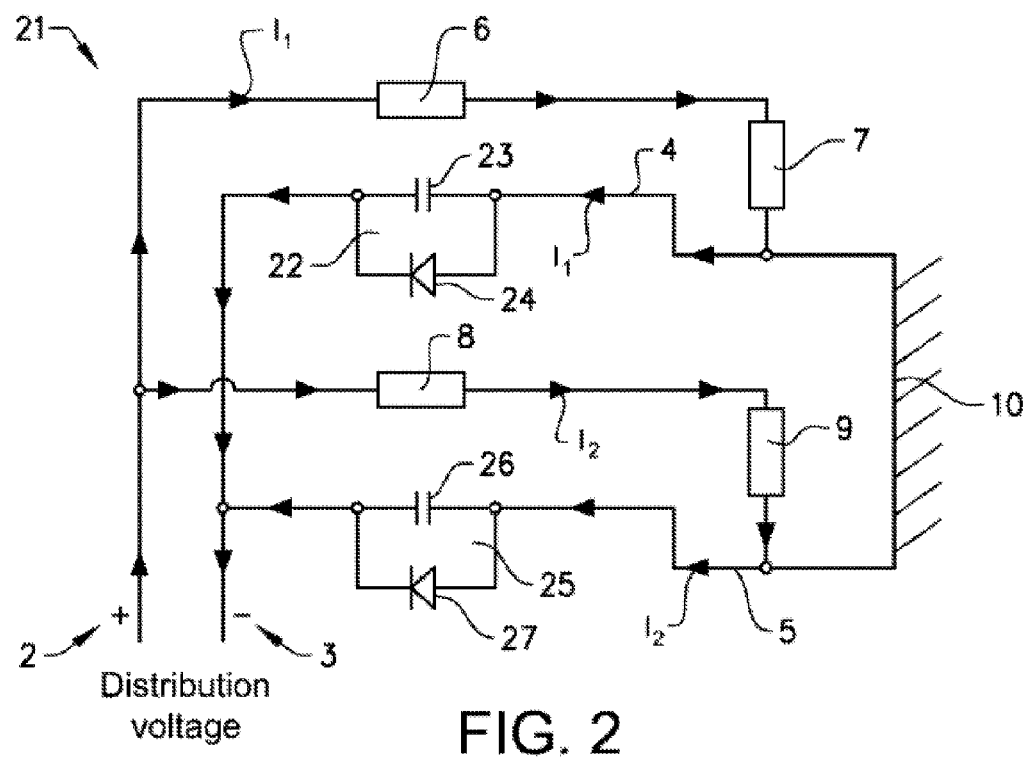
FIG. 2 shows a schematically illustration of a power supply arrangement according to the invention.

The present invention prevents low frequency currents from circulating in the arrangement while the increases in weight and needed volume are small. Low frequency currents may be defined as currents in the range of 0 to 100 kHz. FIG. 2 shows an example of the inventive distributing power supply arrangement 21. This power supply arrangement 21 comprise a DC power source having a positive terminal 2 and a negative terminal 3, a first converter 6, a first consumer 7, a first return line 4, a second converter 8, a second consumer 9, a second return line and a chassis 10 to which the first and second consumers 7, 9 are connected. Further said power supply arrangement 21 comprises a first capacitor 23 and a first electrical device 24 with diode function which are connected in parallel in the first return line 4, and a second capacitor 26 and a second electrical device 27 with diode function which are connected in parallel in the second return line 5. Said first capacitor 23 and a first electrical device 24 with diode function constitute the first unit 22 and said second capacitor 26 and a second electrical device 27 with diode function constitute the second unit 25. The first current $I_1$ illustrates the flow from plus to minus through the first converter 6, the first consumer 7 and the first unit 22 and the first return line 4. The second current $I_2$ illustrates the flow from plus to minus through the second converter 8, the second consumer 9 and the second unit 25 and the second return line 5. The circulating ground loop currents $I_3$ which are exhibit in the known distributed power arrangement 1 illustrated in FIG. 1 are prevented in the inventive power supply arrangement 21 illustrated in FIG. 2.

The first and second converters 6, 8 may be any type of DC-to-DC converter which is an electronic circuit which converts a power source of direct current (DC) from one voltage level to another. Each first and second converter 6, 8 may supply many consumers or loads, and the first and second converters 6, 8 may supply DC of different voltage.

In the first and second converters 6, 8, the currents $I_1$, $I_2$ are pulsed with the switching frequency in the supply lines but also in the return lines 4, 5. Therefore, said first and second capacitors 23, 26 in the return lines 4, 5 will, if large enough, permit the pulsed currents to pass through the capacitors 23, 26 whereas they will block DC and low-frequency currents. High-frequency currents is permitted to pass said first and second capacitors 23, 26. High frequency currents may be defined as currents in the range of 0.5 MHz and above. When such capacitors 23, 26 are included in the return lines 4,5 of the first and second converters 6, 8, a potential difference will emerge with time. This effect is reversed by the insertion of first and second electrical devices 24, 27 in parallel with the first and second capacitors 23, 26 as illustrated in FIG. 2. The electrical devices 24, 27 with diode function allows DC currents to flow, but only in one direction, which is the direction where a current flows from plus to minus in the distribution. The addition of the first and second electrical devices 24, 27 with diode function in parallel with a capacitor 23, 26 do not permit the circulating ground loop currents $I_3$. Thus, the circulating ground loop currents $I_3$ which are present in the known distributed power arrangement 1 is not present in the inventive power supply arrangement 21. The diode function can be realized by any standard type diode. The first and second electrical devices 24, 27 with diode function stabilises the potential around said first and second units 22, 25, thus preventing any build-up of charge at said first and second capacitors 23, 26.

In the power supply arrangement 21 the current passes the first and second capacitors 23, 26 without or with small power losses, and the first and second electrical devices 24, 27 with diode function prevent permanent build-up of charge while still not permitting circulating currents. Further, circulating ground loop currents are prevented and blocked by the first and second capacitors 23, 26, as well as by the first and second electrical devices 24, 27 with diode function.

The first and second capacitors 23, 26 connected in parallel to the respective first and second electrical devices 24, 27 having diode function, are adapted to block circulating loop currents within said distributing power supply arrangement 21. Said first and second capacitors 23, 26, connected in parallel to the respective electrical devices 24, 27 with diode function, are adapted to permit currents to pass within said distributing power supply arrangement 21 when said current is a high-frequency current.

The power supply arrangement 21 allows a majority of the currents to pass through the first and second capacitors 23, 26 and at normal operation of the power supply arrangement 21 more than 90 percent of the currents pass via the first and second capacitors 23, 26. The first and second capacitors 23, 26 provides galvanic insulation and stops DC and conveys most part of the high frequency pulsed current. The first and second electrical devices 24, 27 also stops DC, in one direction, and provides a fixed voltage potential on both sides of the units 22, 25. Thus, the first and second units 22, 25 prevents circulating currents and exhibits small power losses due to the small currents through the first and second electrical devices 24, 27 with diode function. The power supply arrangement 21 has low weight, small size, and leads to smaller power losses than using transformers or diodes only.

Typical switching frequencies of the first and second converters 6, 8 are in the MHz region. The MHz-region is in the range of 0.5 MHz and above. Further, the first and second capacitors 23, 26 are selected to stop low-frequency currents, such as 400/2400 Hz from aircraft mains.

In the power supply arrangement 21 the first electrical device 24 with diode function in the upper first return line 4 is blocking currents which are circulating clockwise whereas the second electrical device 27 in the lower second return line 5 is blocking currents which is circulating anti-clockwise. Further, the inventive power supply arrangement 21 may comprise several converters in any type of combination, for example more than 10 converters.

The distribution voltage of the power supply arrangement 21 may be of any type of voltage value. A typical value of distribution voltage used in the power arrangement 21 is for example 48 V. The load voltage of the consumers used in the power supply arrangement 21 may be of any type of voltage value. A typical value of load voltage used in the power supply arrangement 21 is for example 9 V. The first and second converters 6, 8 used in the power supply arrangement 21 may be of the less heavy and less bulky non-isolated type.

The present invention may be used for any type of power distributing arrangement or system and may be used in various types of applications, such as for example radar antennas, airplanes and vehicles.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description thereto are to be regarded as illustrative in nature, and not restrictive.

The invention claimed is:

1. Power supply arrangement for distribution of power from a DC power source having a positive terminal and a negative terminal to at least a first and a second DC power consumer, comprising:
   a first DC power consumer connected to said negative terminal of said DC power source by means of at least a first return line;
   a first DC-DC switching power converter connected to said first DC power consumer, and connected to said positive terminal of said DC power source;
   a second DC power consumer connected to said negative terminal of said DC power source by means of at least a second return line;
   a second DC-DC switching power converter connected to said second DC power consumer, and connected to said positive terminal of said DC power source,
   wherein:
   a first unit comprising a first capacitor connected in parallel with a first electrical device is arranged in said first return line;
   said first electrical device has a diode function, and a second unit comprising a second capacitor connected in parallel with a second electrical device is arranged in said second return line; and
   said second electrical device has a diode function.

2. A power supply arrangement according to claim 1, wherein at least one of said first and second electrical devices is a diode.

3. A power supply arrangement according to claim 1, wherein at least one of said electrical devices is a bipolar transistor.

4. A power supply arrangement according to claim 1, wherein said first and second electrical devices connected in parallel are configured to (a) stabilize and determine the potential of said first and second units, and (b) prevent charge build-up at said parallel connected first and second capacitors.

5. A power supply arrangement according to claim 1, wherein said first and second capacitors connected in parallel are configured to block circulating loop currents within said distributing power supply arrangement.

6. A power supply arrangement according to claim 1, wherein the switching frequency of said first and second DC-DC switching power converters is in the MHz-region.

7. A power supply arrangement according to claim 1, wherein the capacitance value of said first and second capacitors are configured to allow current of the switching frequency of said first and second DC-DC switching power converters to pass while not allowing currents of frequency lower than the switching frequency of said first and second DC-DC switching power converts to pass.

8. A power supply arrangement according to claim 1, wherein at least one of said first and second DC-DC switching power converters is of non-isolated type.

9. A vehicle comprising the power supply arrangement according to claim 1.

* * * * *